US009106896B2

United States Patent
Jung et al.

(10) Patent No.: US 9,106,896 B2
(45) Date of Patent: Aug. 11, 2015

(54) METHOD AND APPARATUS FOR NON-REAL TIME STEREOSCOPIC VIDEO SERVICE

(75) Inventors: Kwanghee Jung, Gyeonggi-do (KR); Kug Jin Yun, Daejeon-si (KR); Gwang Soon Lee, Daejeon-si (KR); Hyoung Jin Kwon, Cheongju-si (KR); Hyun Jeong Yim, Seoul (KR); Nam Ho Hur, Daejeon-si (KR); Soo In Lee, Daejeon-si (KR); Yoon Jin Lee, Youngin-si (KR)

(73) Assignee: Electronics and Telecommunications Research Institute, Daejeon-si (KR)

( * ) Notice: Subject to any disclaimer, the term of this patent is extended or adjusted under 35 U.S.C. 154(b) by 517 days.

(21) Appl. No.: 13/277,081

(22) Filed: Oct. 19, 2011

(65) Prior Publication Data

US 2012/0092465 A1    Apr. 19, 2012

(30) Foreign Application Priority Data

Oct. 19, 2010   (KR) .................. 10-2010-0102150
Mar. 24, 2011   (KR) .................. 10-2011-0026449

(51) Int. Cl.
*H04N 13/04*    (2006.01)
*H04N 13/00*    (2006.01)

(52) U.S. Cl.
CPC ....... *H04N 13/0066* (2013.01); *H04N 13/0059* (2013.01)

(58) Field of Classification Search
USPC ...................................... 348/43–60
See application file for complete search history.

(56) References Cited

U.S. PATENT DOCUMENTS

| 2003/0099297 A1* | 5/2003 | Gendel ............... 375/240.26 |
| 2010/0141738 A1* | 6/2010 | Lee et al. .............. 348/43 |
| 2011/0075997 A1* | 3/2011 | Begen et al. ........... 386/356 |

FOREIGN PATENT DOCUMENTS

| EP | 2211556 A1 * | 7/2010 | ............ H04N 7/24 |
| EP | 1454418 B1 * | 8/2012 | |
| KR | 10-2004-0036447 | 4/2004 | |
| KR | 1020100050426 | 5/2010 | |
| KR | 1020100086440 | 7/2010 | |

* cited by examiner

*Primary Examiner* — Sath V Perungavoor
*Assistant Examiner* — Dakshesh Parikh
(74) *Attorney, Agent, or Firm* — Nelson Mullins Riley & Scarborough LLP; Anthony A. Laurentano, Esq.; Lewis Lee, Esq.

(57) ABSTRACT

A non-real time stereoscopic video service method and apparatus are provided. The non-real time stereoscopic video service method performed by a reception apparatus, including: extracting a program association table (PAT) from a received transport stream (TS) and analyzing the same; extracting a program map table (PMT) corresponding to a program selected by a user from the PAT and analyzing the same; extracting a stereoscopic video service descriptor from the PMT and analyzing the same; generating frame and/or time information of an image to be reproduced according to the analysis of the stereoscopic video service descriptor; and reproducing an image by synchronizing a reference image and a supplementary image based on the generated frame and/or time information.

13 Claims, 4 Drawing Sheets

METHOD AND APPARATUS FOR NON-REAL TIME STEREOSCOPIC VIDEO SERVICE

CROSS-REFERENCE TO RELATED APPLICATIONS

This application claims the benefit of priority of Korean Patent Application No. 10-2010-0102150 filed on Oct. 19, 2010, and Korean Patent Application No. 10-2011-0026449 filed on Mar. 24, 2011, all of which are incorporated by reference in their entirety herein.

BACKGROUND OF THE INVENTION

1. Field of the Invention

The present invention relates to a broadcast transmission and reception method and a broadcast transmission and reception system and, more particularly, to a broadcast transmission and reception method and a broadcast transmission and reception system for providing three-dimensional (3D) stereoscopic broadcast in non-real time.

2. Related Art

A stereoscopic video service provides a stereoscopic image to a viewer through video images of left and right views. Since a stereoscopic image is provided to the viewer through images of left and right views, a larger amount of data should be transmitted in the stereoscopic video service in comparison to a monoscopic video service.

Meanwhile, multiplexing a reference image (reference video or reference data) and a supplementary image (supplementary video or supplementary data) and transmitting the same for a stereoscopic service is called a real time stereoscopic service. However, as mentioned above, in order to provide the stereoscopic video service, a large amount of data is required to be transmitted, and here, because of a limitation in a data transfer rate, or the like, it is difficult to transmit data of the reference video and data of the supplementary video in real time.

SUMMARY OF THE INVENTION

It is, therefore, an object of the present invention to provide a method for stably, smoothly providing a non-real time stereoscopic video service.

Another object of the present invention is to provide a method for synchronizing a reference image and a supplementary image even when time information of an image frame to be reproduced is not obtained, namely, even when a program map table is not received or even when time stamp information regarding a frame is not received.

In order to accomplish the above objects, there is provided a non-real time stereoscopic video service method performed by a transmission apparatus, including: configuring a program map table (PMT) and a program association table (PAT) including information regarding the PAT; and transmitting a transport stream (TS) signal including the PMT and the PAT, wherein the PMT includes a stereoscopic service descriptor with respect to a program corresponding to the PMT, and the stereoscopic service descriptor includes information of a time stamp regarding a start of a stereoscopic video service with respect to the program and information regarding access unit (AU) numbers of video images which have been transmitted so far after the stereoscopic video service with respect to the program was started.

The stereoscopic service descriptor may be included in a descriptor loop of the PMT.

The start of the stereoscopic video service may be initiated by a non-real time (NRT) marker.

Information regarding the AU numbers of video images which have been transmitted so far after the stereoscopic video service with respect to the program was started may be AU numbers of 3D video images.

The stereoscopic service descriptor may further include image characteristics information indicating whether a transmitted image is a left image or a right image.

The image characteristics information may be identification information discriminating whether a transmitted image is a left image or a right image and may be described in a content name.

In order to accomplish the above objects, there is also provided a non-real time stereoscopic video service method performed by a transmission apparatus, including: configuring a stereoscopic video service descriptor; configuring a program map table (PMT) and a program association table (PAT); and transmitting a TS signal including the PMT and the PAT, wherein the configuring of the stereoscopic video service descriptor includes: designating an initial time stamp value of a non-real time stereoscopic service corresponding to the stereoscopic video service descriptor; and configuring counting information of access unit (AU) packets which have been transmitted so far from a point in time at which the non-real time stereoscopic service corresponding to the stereoscopic video service descriptor was started, wherein the stereoscopic video service descriptor is included in the PMT.

In order to accomplish the above objects, there is also provided a non-real time stereoscopic video service method performed by a reception apparatus, including: extracting a program association table (PAT) from a received transport stream (TS) and analyzing the same; extracting a program map table (PMT) corresponding to a program selected by a user from the PAT and analyzing the same; extracting a stereoscopic video service descriptor from the PMT and analyzing the same; generating frame and/or time information of an image to be reproduced according to the analysis of the stereoscopic video service descriptor; and reproducing an image by synchronizing a reference image and a supplementary image based on the generated frame and/or time information, wherein the generating of the frame and/or time information of the image to be reproduced includes: determining whether or not time stamp information regarding the image to be reproduced has been lost; and when it is determined that the time stamp information has been lost, generating the frame and/or time information based on time stamp information regarding a start of a stereoscopic video service included in the stereoscopic video service descriptor and information regarding access unit (AU) numbers of video images which have been transmitted so far after the stereoscopic video service was started.

The stereoscopic service descriptor may be included in a descriptor loop of the PMT.

The start of the stereoscopic video service may be initiated by a non-real time (NRT) marker.

Information regarding the AU numbers of video images which have been transmitted so far after the stereoscopic video service with respect to the program was started may be AU numbers of 3D video images.

The stereoscopic service descriptor may further include image characteristics information indicating whether a transmitted image is a left image or a right image, and in the reproducing of the image, the received image may be reproduced as a left image or a right image according to the image characteristics information.

When it is determined that the time stamp information with respect to the image to be reproduced has not been lost, the reference image and the supplementary image may be synchronized based on the time stamp so as to be reproduced.

In the reproducing of the image, a supplementary image corresponding to the generated frame and/or time information, among previously stored supplementary images, may be obtained and synchronized with a reference image received in real time so as to be reproduced.

In order to accomplish the above objects, there is also provided a non-real time stereoscopic video service method performed by a reception apparatus, including: extracting a program association table (PAT) from a received transport stream (TS) and analyzing the same; extracting a program map table (PMT) corresponding to a program selected by a user from the PAT and analyzing the same; extracting a stereoscopic video service descriptor from the PMT and analyzing the same; generating frame and/or time information of an image to be reproduced according to the analysis of the stereoscopic video service descriptor; and reproducing an image by synchronizing a reference image and a supplementary image based on the generated frame and/or time information, wherein the generating of the frame and/or time information of the image to be reproduced includes: determining whether or not time stamp information regarding the image to be reproduced has been lost; and when it is determined that the time stamp information has been lost, calculating the counting number of access units (AUs) of video images which have been transmitted so far after the stereoscopic video service included in the stereoscopic video service descriptor was started, from stereoscopic video service start time information included in the stereoscopic video service descriptor, to calculate a synchronization time.

In the reproducing of the image, a supplementary image corresponding to the calculated synchronization time, among previously stored supplementary images, may be obtained and synchronized with a reference image received in real time so as to be reproduced.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE EMBODIMENTS

The present invention relates to a non-real time stereoscopic video service and provides a signaling method by complementing time information and frame information even when a packet error occurs, like a situation in which a program map table cannot be received, by describing time information and frame information in a transport stream (TS) transmitted in real time.

In a real time stereoscopic video service, a reference image (reference video or reference data) and a supplementary image (supplementary video or supplementary data) for a stereoscopic service are multiplexed and transmitted.

In comparison, in a non-real time stereoscopic video service, among a reference image and a supplementary image for a stereoscopic service, the supplementary image is previously stored in a reception apparatus, and the reference image transmitted later is processed along with the stored supplementary image to thus provide the stereoscopic video service.

In the non-real time stereoscopic video service, the reception apparatus may obtain the supplementary image in advance, namely, in non-real time, in various manners.

For example, the reception apparatus may download a supplementary image in the form of a file by using a MOT (multimedia object transfer) protocol, or the like. Also, the supplementary image may be downloaded in the form of a file through the high-speed cable Internet and may be moved to the reception apparatus through a portable storage device. Also, when the reception apparatus supports the mobile Internet, it may previously download the supplementary image in the form of a file through the mobile Internet.

Figure 1:
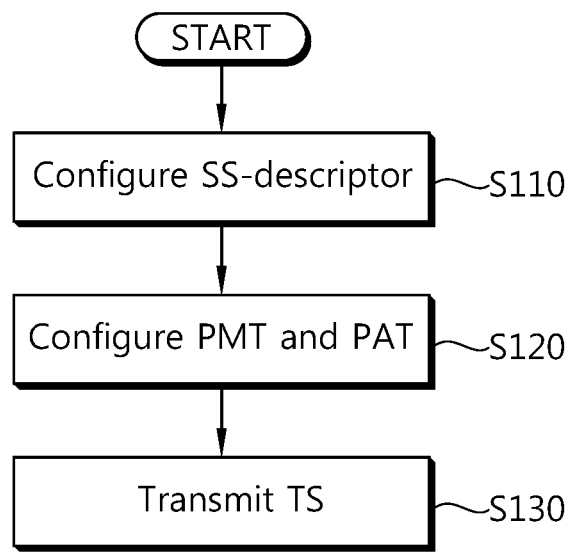
FIG. 1 is a flow chart illustrating an operation of a broadcast transmission apparatus in a system according to an embodiment of the present invention.

FIG. 1 is a flow chart illustrating an operation of a broadcast transmission apparatus in a system according to an embodiment of the present invention.

In order to provide a stereoscopic video service, a transmitter configures a stereoscopic service descriptor (SS descriptor) (S110).

The stereoscopic video service may provide only a stereoscopic video or may be provided together with a service providing a monoscopic video. Thus, a stereoscopic service descriptor is defined to perform signaling on information regarding the non-real time stereoscopic service.

The stereoscopic service descriptor may be included in a descriptor loop in a PMT (Program Map Table), one of PSI (Program Specific Information) of a TS layer of MPEG-2, MPEG-4, or the like. Also, the descriptor loop may be positioned next to program_info_length in the PMT. Details of the stereoscopic service descriptor configured according to an embodiment of the present invention will be described later.

The transmitter configures a PMT and a PAT (Program Association Table) (S120).

The MPT includes a stereoscopic service descriptor. Thus, a PMT corresponding to a program selected from the PAT may be extracted, and then, a stereoscopic service descriptor may be extracted from among the descriptors of the extracted PMT.

A reference video and a supplementary video can be accurately synchronized by using the extracted stereoscopic service descriptor in an embodiment of the present invention (to be described).

The configured PMT, PAT, and the like, are transmitted as an MPEG-2 TS (Transport Stream) signal to a receiver (S130).

Meanwhile, the stereoscopic service descriptor may be variably configured to include information required for providing the stereoscopic service. For example, the stereoscopic service descriptor may be configured by compatibly extending SDS_descriptor defined in the standard of a DMB (Digital Multimedia Broadcasting) video-interworking stereoscopic data service, or the same descriptor tag may be used.

Table 1 shows an example of the stereoscopic service descriptor (SS_descriptor) configured according to an embodiment of the present invention.

TABLE 1

| Syntax | bits | description |
|---|---|---|
| SS_descriptor ( ) { | | |
|     descriptor_tag | bit (8) | 0x40 |
|     descriptor_length | bit (8) | 0x01 |
|     StereoMono_serviceFlag | bit (1) | |
|     If (StereoMono_serviceFlag) { | | |
|         ServiceType | bit (3) | |
|         CompositionType | bit (3) | |
|         LR_first | bit (1) | |
|     } | | |
|     else { | | |
|         Reserved | const bit (7) | reserved = 0 |
|     } | | |
|     If ( SereoMono_ServiceFlag == 1 ) { | | |
|     If ( ServiceType==000 \|\| ServiceType==010 ) { | | |
|         reserved | const bit (5) | reserved = 0 |
|         is_Left | bit (1) | |
|         NRT_Marker | bit (2) | |
|         ContentNameLength | bit (8) | |
|         for ( i=0; i<ContentNameLength; i++) | | |
|             ContentName_byte | bit (8) | |
|         If ( ServiceType==010 ) { | | |
|             ExpireDate | bit (8) | |
|             FileSize | bit (8) | |
|         } | | |
|         FirstAUTimeStamp | bit (33) | |
|         LastAUNumber | bit (31) | |
|         } | | |
|     } | | |
| } | | |

The stereoscopic service descriptor as shown in Table 1 may be included in a descriptor loop of the PMT, and may include information as follows.

StereoMono_serviceFlag: This syntax indicates whether a stereoscopic video service is provided or a monoscopic video service is provided by 1 bit. It may indicate the stereoscopic video service by using a value 1, and may indicate the monoscopic video service by using a value 0. The receiver may turn on or off a stereoscopic reproducing device (or stereoscopic player) according to the value of StereoMono_serviceFlag.

ServiceType: This syntax indicates a type of a stereoscopic video service. For example, in case of a stereoscopic video service provided by terrestrial DMB, value (000) of ServiceType may correspond to a terrestrial DMB non-real time MOT (Multimedia Object Transfer)/stream mode stereoscopic video service, value (001) of ServiceType may correspond to terrestrial DMB non-real time MOT/stream mode video-interworking stereoscopic data service, and value (010) of ServiceType may correspond to a terrestrial DMB non-real time repeated content stereoscopic video service. Also, values (011)~(111), or the like, may be reserved for a stereoscopic video service which may be used in the future, may be used for a stereoscopic video service other than standards, or may be reserved for a case in which a syntax is extended.

CompositionType: This syntax indicates a configuration type of received (transmitted) stereoscopic data. For example, in case of a stereoscopic video service provided by terrestrial DMB, value (001) of CompositionType may correspond to a basic format (e.g., left and right images have the same resolution), and value (010) of CompositionType may correspond to an optional format (e.g., resolution of supplementary image is half in horizontal direction over reference image, etc.). Also, (000), (011), (100)~(111) may be reserved or may be used to correspond to a format other than standards.

LR_first: This syntax indicates whether a reference image is a left image or a right image. For example, it may use 0 when a reference image is a right image, and may use 1 when the reference image is a left image. Here, the reference image may be multiplexed image data transmitted in a TS in real time.

is_Left: This syntax is image characteristics information indicating whether a transmitted image is a left image or a right image. When a corresponding image is a left image, "_L" may be added to a content name to indicate that the image is a left image, and when a corresponding image is a right image, "_R" may be added to a content name to indicate that the image is a right image.

NRT_Marker: It indicates a start position for synchronizing left and right images, i.e., a reference image and a supplementary image. For example, in case of a stereoscopic video service provided by terrestrial DMB, value (01) of NRT_Marker may indicate that a TS packet in which payload_unit_start_indicator is 1 for the first time, among video TS packets following a corresponding PMT, is a packet in which the last AU (Access Unit) of a non-real time stereoscopic video stream starts. As for value (10) of NRT_Marker, NRT_Markers of PMT transmitted between a PMT having NRT_Marker of 01 and a PMT having NRT_Marker of 11 are set to be this value, and value (11) of NRT_Marker may indicate that a TS packet in which payload_unit_start_indicator is 1 for the first time, among video TS packets following the PMT, is a packet in which the first AU of a non-real time stereoscopic video stream starts. Also, value (00) may be reserved.

ContentNameLength: This syntax indicates the length of a content name by byte.

ContentName: In the non-real time stereoscopic video service, data for a supplementary image is first downloaded and stored, and then, processed together with data of a reference image transmitted in real time. ContentName syntax indicates information for configuring a file name of an image required in this case. For example, in case of the terrestrial DMB non-real time MOT/stream mode stereoscopic service, ContentName may be stored as a file name including a supplementary image ES (Elementary Stream) stored in the reception apparatus. Also, in case of the terrestrial DMB non-real time repeated content stereoscopic video service, ContentName may be used to designate a file including the supplementary image ES stored in the terrestrial DMB reception apparatus or may be used to store a reference image ES as a file in the reception apparatus.

ExpireDate: This syntax indicates a preservation term recommended for the ES to be stored as a filed in a storage device. For example, in the case of terrestrial DMB non-real time repeated content stereoscopic video service, it indicates a preservation term recommended by the terrestrial DMB transmission apparatus with respect to the ES to be stored as a file in the storage device.

FileSize: This syntax indicates a minimum storage capacity recommended for an ES to be stored as a file in the storage device. For example, in the case of the terrestrial DMB non-real time repeated content stereoscopic video service, FileSize indicates a memory capacity recommended by a terrestrial DMB transmission apparatus with respect to an ES to be stored as a file.

FirstAUTimeStamp: It records a service start time stamp started by NRT_Marker.

LastAUNumber: It has recorded AU numbers of 3D images which has been transmitted so far since a service started by NRT_Marker.

As described above, is_Left flag in Table 1 is used to indicate whether a currently transmitted image is a left image or a right image, store content, and performing signaling. Value 0 of is_Left may be designated to indicate a left image and value 1 of is_Left may be designated to indicate a right image, or conversely, value 0 of is_Left may be designated to indicate a right image, and value 1 of is_Left may be designated to indicate a left image. Thus, in the non-real time stereoscopic video service, whether a received stream is a left image or a right image is discriminated by checking the is_Left flag of a stream transmitted in real time, thus loading an image appropriate for constituting a stereoscopic video image among stored left and right images.

FirstAUTimeStamp and LastAUNumber in Table 1 may be used to synchronize a reference image and a supplementary image.

FirstAUTimeStamp records timestamp concerning a start time of the non-real time stereoscopic video service and provides it as synchronization information.

LastAUNumber describes the number of frames after the non-real time stereoscopic video service starts and provides it as a synchronization information.

A method for synchronizing a reference image and a supplementary image by using the information of FirstAUTimeStamp and LastAUNumber will be described in detail as follows.

In a transmission standard used in a broadcast, generally, the value of the number of frames per second used for a broadcast is previously determined, so a PTS (Presentation Time Stamp) value of PES (Packetized Elementary Stream) can be calculated based on the PMT transmitted in real time in a TS file stored in the reception apparatus. Thus, although PMT information is lost, a currently transmitted image frame and the stored non-real time stereoscopic supplementary image file can be synchronized by using the PMT transmitted later.

For example, when the number of frames per second defined in the current broadcast transmission standard is 30 and the value of LastAUNumber is 90, it may be calculated that the frame of an image to be currently provided is an image provided in three seconds after the non-real time stereoscopic video service is executed. Here, the time at which the non-real time stereoscopic video service is executed can be recognized by FirstAUTimeStamp.

Thus, even if time stamp information of a stream transmitted in real time is lost, the reference image and the supplementary image can be synchronized by using PMT information that immediately follows.

Figure 2:
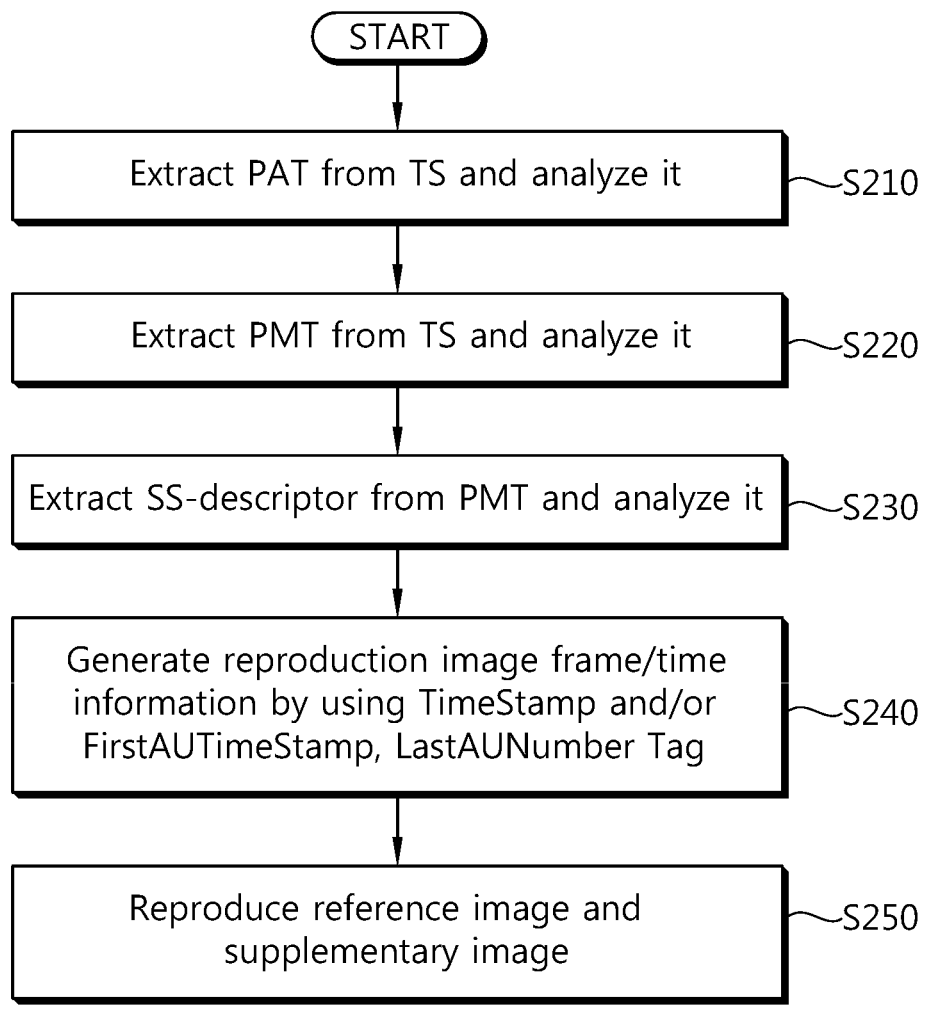
FIG. 2 is a flow chart illustrating an operation of a broadcast reception apparatus in a system according to an embodiment of the present invention.

FIG. 2 is a flow chart illustrating an operation of a broadcast reception apparatus in a system according to an embodiment of the present invention.

The broadcast reception apparatus extracts a PAT included in a received MPEG-2 TS (S210). The present invention can be applicable to various non-real time stereoscopic video services using MPEG-2, MPEG-4, or the like, and here, a case in which the non-real time stereoscopic video service is provided through an MPET-2 transport stream will be taken as an example.

The reception apparatus extracts a PMT corresponding to a program selected by a user from the extracted PAT, from the MPEG-2 TS (s2200). The extracted PMT includes stereoscopic service descriptors SS_descriptor corresponding to the selected program.

The reception apparatus extracts a stereoscopic service descriptor from among the descriptors corresponding to the user selected program, and analyzes information defined in the extracted stereoscopic service descriptor (S230). For example, the reception apparatus may check ServiceType information and extract a reference image included in the received MPEG-2 TS based on ContentName, or the like.

A reproduction image frame and time information are generated by using the received time stamp information and/or FirstAUTimeStamp and LastAUNumber flags (S240).

Supplementary information corresponding to the reference image is obtained from the generated reproduction image frame and the time information, and a stereoscopic image is reproduced (S250).

Figure 3:
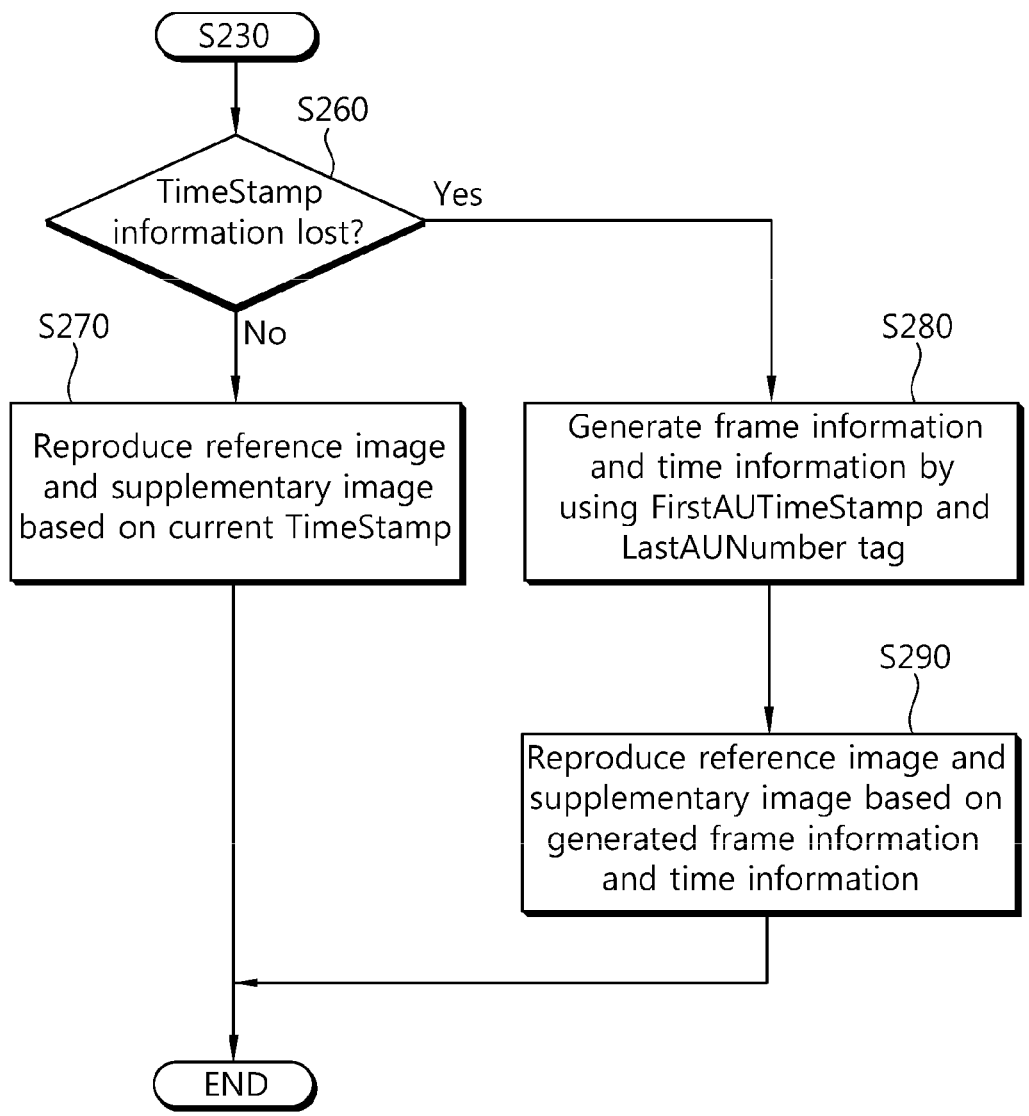
FIG. 3 is a flow chart illustrating a process of generating reproduction image frame and time information and reproducing a reference image and a supplementary image in FIG. 2.

FIG. 3 is a flow chart illustrating a process of generating reproduction image frame and time information (S240) and reproducing a reference image and a supplementary image (S250) in FIG. 2.

The reception apparatus, analyzing the information defined in the stereoscopic service descriptor, determines whether or not time stamp information has been damaged (S260).

In the stereoscopic video service, synchronization of left and right images refers to simultaneously inputting a left image and a right image (reference image and supplementary image) to a stereoscopic display.

In the non-real time stereoscopic video service, the reference image is transmitted in real time through a TS, while the supplementary image has been previously transmitted and stored in a storage unit (memory) of the reception apparatus. Thus, in order to read the supplementary image corresponding to the reference image transmitted in real time from the storage unit and synchronize it, information as temporal reference between the reference image and the supplementary image is required.

Information regarding a start point of the stereoscopic video service is transferred by NRT_Marker. Namely, the position of a first frame from which the stereoscopic video service starts may be signaled by the NRT_Marker value within the stereoscopic service descriptor. NRT_Marker indicates a start point of the stereoscopic video service, indicates that the stereoscopic video service is being currently provided by changing the value, and indicates that the stereoscopic video is terminated by changing the value again.

Namely, NRT_Marker indicating a start point of the stereoscopic video service is reference information required for configuring first frames of left and right images as a pair. Thus, when power is applied to the reception apparatus or when the channel of the reception apparatus has been changed after NRT_Marker indicating a start point of the stereoscopic video service is transmitted, although the reception apparatus is receiving a stream corresponding to a reference video of stereoscopic content, it cannot easily know which portion of the supplementary image file stored in the memory is to be read to pair the left and right images. In other words, unless NRT_Marker indicating a start point of the stereoscopic video service is transmitted is received from the beginning to synchronize the left and right images from a first frame, although NRT_Marker is received later, it is difficult to know when the stereoscopic video service was started, making it difficult to synchronize the reference image and the supplementary image to provide a stereoscopic video image. However, even in this case, the reference image and the supplementary image can be accurately synchronized by using the two flags of FirstAUTimeStamp and LastAUNumber as described above.

Namely, even if NRT_Marker indicating a start point of the stereoscopic video service is not received from the beginning or lost midway (e.g., when the corresponding PMT is not received), the reference image and the supplementary image can be synchronized by using FirstAUTimeStamp and LastAUNumber defined in the stereoscopic service descriptor in a newly received PMT. Namely, information (time stamp) regarding a service start time by NRT_Marker is described in FirstAUTimeStamp, and information regarding the order of a current 3D image among 3D images after the service was started is described in LastAUNumber. Thus, a synchronization time of the image to be currently reproduced can be calculated based on the image processing rule such as previously defined number of frames per second, or the like.

The reception apparatus reads the supplementary image corresponding to the calculated synchronization time and simultaneously inputs it with the corresponding reference image to the stereoscopic display, thus providing the stereoscopic video service.

Thus, the reception apparatus may determine whether or not time stamp information with respect to the image to be currently reproduced (S260), and then effectively provide the stereoscopic video service according to the determination results.

When the reception apparatus determines that the time stamp information with respect to the image to be currently reproduce has not been lost, namely, when NRT_Marker indicating a start point of the stereoscopic video service has been received from the beginning and information regarding a synchronization time has not been lost later, the reception apparatus can synchronize the reference image and the supplementary image based on the current time stamp to reproduce them (S270).

Meanwhile, when the reception apparatus determines that the time stamp information with respect to the image to be currently reproduced has been lost, namely, when NRT_Marker indicating a start point of the stereoscopic video service has not been received from the beginning and information regarding a synchronization time has been lost later, the reception apparatus may generate the frame information and the time information by using FirstAUTimeStamp and LastAUNumber as described above (S280).

The reception apparatus may reproduce the reference image and the supplementary image by synchronizing them based on the frame information and the time information generated by using FirstAUTimeStamp and LastAUNumber (S290).

Figure 4:
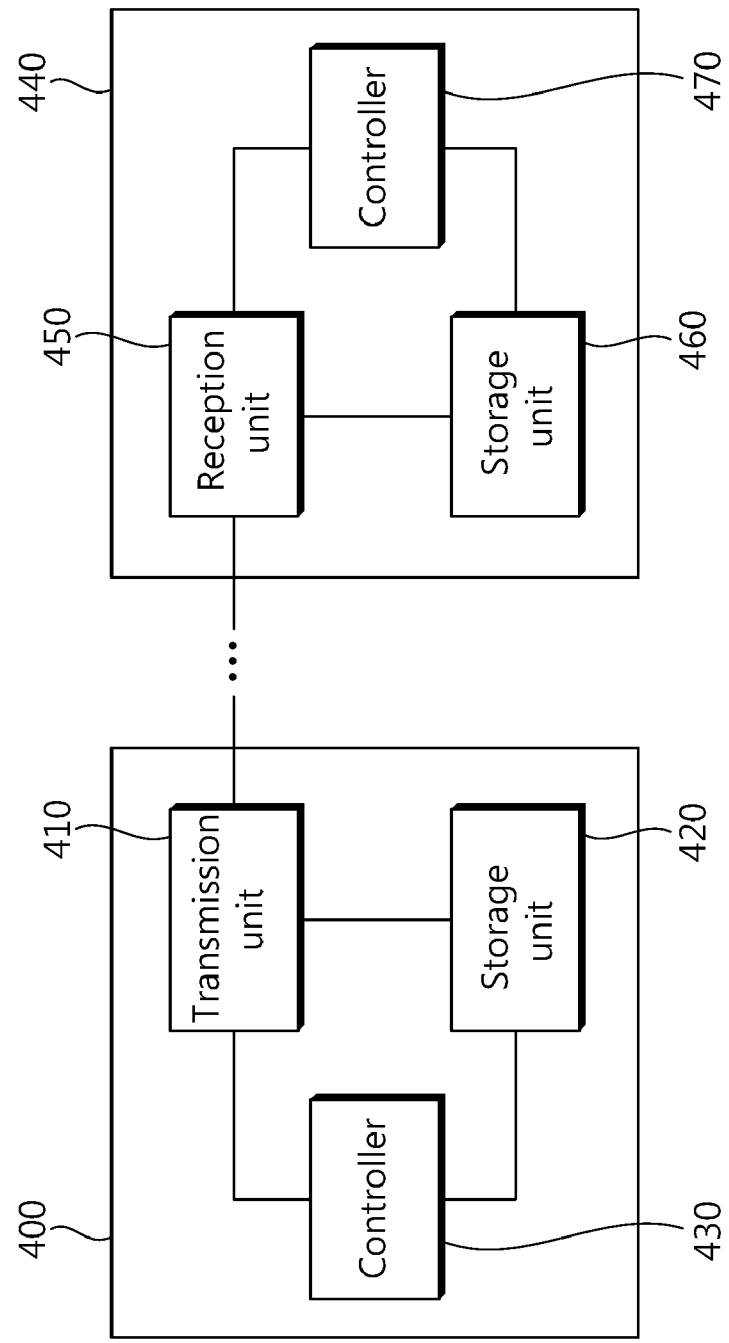
FIG. 4 is a schematic block diagram of a transmission apparatus and a reception apparatus of a stereoscopic video service system according to an embodiment of the present invention.

FIG. 4 is a schematic block diagram of a transmission apparatus and a reception apparatus of a stereoscopic video service system according to an embodiment of the present invention.

A transmission apparatus 400 includes a transmission unit 410, a storage unit 420, and a controller 430.

The transmission apparatus 400 transmits a transport stream (TS) required for a video service through the transmission unit 410. The transmission apparatus 400 may transmit a TS dedicated for a stereoscopic video service or may transmit a TS providing a stereoscopic video service along with a monoscopic video service. Here, the transmitted TS includes a stereoscopic service descriptor for providing a stereoscopic video service.

The storage unit 420 stores various types of information required for transmitting data. For example, the storage unit 420 may store required information such as protocol information between the transmission apparatus 400 and a reception apparatus, information regarding a reference image and a supplementary image, information regarding a synchronization time, and the like.

The controller 430 is connected with the transmission unit 410 and the storage unit 420 and controls the transmission unit 410 and the storage unit 420. The controller 430 configures data to be transmitted in a TS. The controller 430 may configure a PMT, a PAT, or the like, and transmit the same in a TS, and may configure a stereoscopic service descriptor for providing a stereoscopic video service. The stereoscopic service descriptor may be included in the PMT and transmitted through the transmission unit 410.

A reception apparatus 440 includes a reception unit 450, a storage unit 460, and a controller 470.

The reception apparatus 440 receives a TS required for a video service through the reception unit 450. The received TS may be a TS dedicated for a stereoscopic video service or may be a TSS providing a stereoscopic video service along with a monoscopic video service. The received TS includes a stereoscopic service descriptor for providing a stereoscopic video service.

The storage unit 460 stores information required for providing an image along with information required for receiving data. For example, the storage unit 460 previously stores a received supplementary image, so that the supplementary image corresponding to a reference image may be used when it is required to be displayed together with the reference image received in real time.

The controller 470 is connected with the reception unit 450 and the storage unit 460 to control the reception unit 450 and the storage unit 460. The controller 470 provides a video service regarding a program selected by a user based on a PAT and a PMS in a received TS. Here, the controller 470 may start and terminate a stereoscopic service by NRT_Marker described in a stereoscopic service descriptor. When information regarding NRT_Marker initiating a stereoscopic service has been lost or when time information regarding synchronization of the reference image and the supplementary image has been lost, the controller 470 may reproduce the reference image and the supplementary image by synchronizing them by using FirstAUTimeStamp and LastAUNumber described in the stereoscopic service descriptor as described above. Meanwhile, the controller 470 may check information such as is_Left described in the stereoscopic service descriptor to check whether a transmitted image, namely, a reference image, is a left image or a right image, and display the reference image along with the supplementary image accordingly, thereby providing a stereoscopic video image to the user.

So far, various examples have been described to help easily understand the present invention, but the present invention is not limited to the foregoing examples and may be variably implemented within the scope of the technical concept of the present invention. For example, the TS using MPEG-2 regarding a transmission scheme according to the present invention has been described as an example, but the present invention is not limited thereto and can also be applicable in the same manner to MPEG-4, or the like. Also, the terrestrial DMB has been taken as an example as an application subject of the present invention, but the present invention is not limited thereto and can also be applicable in the same manner to various services providing an image service in a TS through the Internet, wired/wireless communication, or the like.

Throughout the specification and claims, unless explicitly described to the contrary, the word "comprise" and variations such as "comprises" or "comprising", will be understood to imply the inclusion of stated elements but not the exclusion of any other elements.

In the exemplary system as described above, the methods are described based on the flow chart by sequential steps or blocks, but the present invention is not limited to the order of the steps, and a step may be performed in different order from another step as described above or simultaneously performed. It would be understood by a skilled person in the art that the steps are not exclusive, a different step may be included, or one or more of the steps of the flow chart may be deleted without affecting the scope of the present invention.

The preferred embodiments of the present invention have been described with reference to the accompanying drawings, and it will be apparent to those skilled in the art that various modifications and variations can be made in the present invention without departing from the scope of the invention. Thus, the technical idea of the present invention should be interpreted to embrace all such alterations, modifications, and variations in addition to the accompanying drawings.

What is claimed is:

1. A non-real time stereoscopic video service method performed by a transmission apparatus, the method comprising:
    configuring a program map table (PMT) and a program association table (PAT) including information regarding the PAT; and
    transmitting a transport stream (TS) including the PMT and the PAT,
    wherein the TS includes a stereoscopic service descriptor with respect to a program corresponding to the PMT, and the TS includes time information regarding a start of a stereoscopic video service and frame information regarding frame number of a reference image,
    wherein the stereoscopic video service is provided by the reference image and a supplementary image being paired with the reference image at a receiver;
    wherein the reference image is received in real time and the supplementary image is received in non-real time at the receiver.
    wherein the stereoscopic video service is reproduced by synchronizing the reference image and the supplementary image being paired with the reference image based on the time information and the frame information.

2. The non-real time stereoscopic video service method of claim 1, wherein the stereoscopic service descriptor is included in a descriptor loop of the PMT.

3. The non-real time stereoscopic video service method of claim 1, wherein the start of the stereoscopic video service is initiated by a non-real time (NRT) marker.

4. The non-real time stereoscopic video service method of claim 1, wherein the frame information regarding the frame number of the reference image which have been transmitted so far after the stereoscopic video service was started is frame number of the reference mage.

5. The non-real time stereoscopic video service method of claim 1, wherein the stereoscopic service descriptor further includes image characteristics information indicating whether a transmitted image is a left image or a right image.

6. The non-real time stereoscopic video service method of claim 5, wherein the image characteristics information is identification information discriminating whether a transmitted image is a left image or a right image and may be described in a content name.

7. A non-real time stereoscopic video service method performed by a reception apparatus, the method comprising:
    extracting a program association table (PAT) from a received transport stream (TS) and analyzing the same;
    extracting a program map table (PMT) corresponding to a program selected by a user from the PAT and analyzing the same;
    extracting a stereoscopic service descriptor from the PMT and analyzing the same;
    generating time information regarding a start of a stereoscopic video service and frame information regarding frame number of a reference image; and
    reproducing the stereoscopic video service by synchronizing the reference image and a supplementary image being paired with the reference image based on the generated time information and the frame information,
    wherein the stereoscopic video service is provided by the reference image and a supplementary image being paired with the reference image,
    wherein the reference image is received in real time and the supplementary image is received in non-real time.

8. The non-real time stereoscopic video service method of claim 7, wherein the stereoscopic service descriptor is included in a descriptor loop of the PMT.

9. The non-real time stereoscopic video service method of claim 7, wherein the start of the stereoscopic video service is initiated by a non-real time (NRT) marker.

10. The non-real time stereoscopic video service method of claim 7, wherein the frame information regarding the frame number of the reference image which have been transmitted so far after the stereoscopic video service was started is frame number of the reference image.

11. The non-real time stereoscopic video service method of claim 7, wherein the stereoscopic service descriptor further includes image characteristics information indicating whether a received image is a left image or a right image, and in the reproducing the stereoscopic video service the received image is reproduced as the left image or the right image according to the image characteristics information.

12. The non-real time stereoscopic video service method of claim 7, wherein when it is determined that a time stamp information with respect to the stereoscopic video service to be reproduced has not been lost, the reference image and the supplementary image are synchronized based on the time stamp so as to be reproduced.

13. The non-real time stereoscopic video service method of claim 7, wherein, reproducing the stereoscopic video service, the supplementary image being paired with the reference image among previously stored supplementary images, is obtained and synchronized with the reference image received in real time so as to be reproduced.

* * * * *